United States Patent [19]

Masaki et al.

[11] 4,194,153
[45] Mar. 18, 1980

[54] DIGITAL RADIO PAGING COMMUNICATION SYSTEM

[75] Inventors: Masaru Masaki; Akio Yotsutani, both of Tokyo, Japan

[73] Assignee: Nippon Electric Co., Ltd., Tokyo, Japan

[21] Appl. No.: 942,260

[22] Filed: Sep. 14, 1978

[30] Foreign Application Priority Data

Sep. 16, 1977 [JP] Japan .................................. 52/112052

[51] Int. Cl.$^2$ ............................................. H04B 5/04
[52] U.S. Cl. ...................................... 455/31; 340/311; 455/343
[58] Field of Search .................... 325/55, 64, 364, 466, 325/492; 179/2 EA, 2 EB, 2 EC; 340/311; 343/201, 203, 205

[56] References Cited

U.S. PATENT DOCUMENTS

3,769,593   10/1973   Williams .............................. 325/492

FOREIGN PATENT DOCUMENTS

1525326   9/1978   United Kingdom ..................... 325/492

OTHER PUBLICATIONS

"New Radio Paging System," M. Komura et al., Japan Telecomm. Review, Jul. 1977, pp. 217–225.

*Primary Examiner*—Marc E. Bookbinder
*Attorney, Agent, or Firm*—Sughrue, Rothwell, Mion, Zinn and Macpeak

[57] ABSTRACT

A digital paging communication system including a transmitter and a plurality of receivers is disclosed. The transmitter generates a preamble digital signal, a calling digital signal and an end mark digital signal in a predetermined sequence. Each receiver demodulates a received signal into the preamble digital signal, calling digital signal and end mark digital signal. These signals are separately detected in synchronism with a recovered clock signal. Power is supplied to the radio frequency, intermediate frequency and demodulator sections of the receiver intermittently until such time as the calling signal of the receiver is detected, after which power is supplied continuously until an end mark signal is detected. The intermittent operation is a battery saving feature.

12 Claims, 12 Drawing Figures

DIGITAL RADIO PAGING COMMUNICATION SYSTEM

BACKGROUND OF THE INVENTION

The present invention relates to a digital radio paging communication system in which a base station (or a transmitter) selectively calls a plurality of receivers, and more particularly to a digital radio paging communication system having battery saving (or low drain) receivers.

Heretofore, in such type of systems (For details, reference is made to Komura et al "New Radio Paging System" *Japan Telecommunication Review*, pp. 217–225, July 1977—Ref. 1), a base station repeatedly transmits a plurality of digital group signals (each group signal having a predetermined time duration and consisting of a synchronizing signal and a plurality of calling signals) On the other hand, a receiver carries out calling, battery saving, etc. in synchronism with its own synchronizing signal contained in its own digital group signal. However, the base station in such a system transmits not only the synchronizing signal but also a signal representing absence of a calling signal even when there is no need to transmit a calling signal. The base station must have a greater transmitting power accordingly. Similarly, the battery saving function of the receiver is lost during the above-mentioned predetermined time duration, regardless of whether a calling signal pertinent to the group is present or absent. This results in the increase in the power consumption at receivers.

Other prior art publications regarding the aforementioned system include the following U.S. Pat. Nos.
- U.S. Pat. No. 2,884,518 issued Apr. 28, 1959—Ref. 2;
- U.S. Pat. No. 2,912,574 issued Nov. 10, 1959—Ref. 3;
- U.S. Pat. No. 3,651,413 issued Mar. 21, 1972—Ref. 4;
- U.S. Pat. No. 3,783,384 issued Jan. 1, 1974—Ref. 5; and
- Reissued U.S. Pat. No. Re. 28,222 reissued Nov. 5, 1974—Ref. 6.

SUMMARY OF THE INVENTION

It is an object of the present invention to provide a digital radio paging communication system having low drain receivers adapted for a novel transmission signal composition, which is free from the above-described disadvantage.

According to one feature of the present invention, there is provided a digital radio paging communication system including a transmitter and a plurality of receivers; characterized in that the transmitter comprises first, second and third means for generating a preamble digital signal, a calling digital signal and an end mark digital signal, respectively, fourth means for selectively controlling the outputs of the first, second and third means to arrange them into a predetermined signal sequence, and fifth means for modulating a carrier wave with the output of the fourth means and successively transmitting the modulated carrier wave; and that the receiver comprises sixth means for receiving said modulated carrier wave and demodulating it into the preamble digital signal, calling digital signal and end mark digital signal, sevemth means for recovering a clock pulse from the output of the sixth means, eighth, ninth and tenth means connected to the output of the sixth means for detecting the preamble digital signal, the calling digital signal and the end mark digital signal in synchronism with the clock pulse, respectively, eleventh means for supplying a power source voltage to the sixth means, twelfth means for generating pulses having a predetermined period, and thirteenth means provided between said eleventh means and the sixth means for controlling the supply of the power source voltage in response to the output of the twelfth means or in response to the outputs of the eighth means and the tenth means.

BRIEF DESCRIPTION OF THE DRAWINGS

The above-mentioned and other features and objects of this invention will become more apparent by reference to the following description taken in conjunction with the accompanying drawings, in which.

DESCRIPTION OF THE PREFERRED EMBODIMENT

Figure 1:
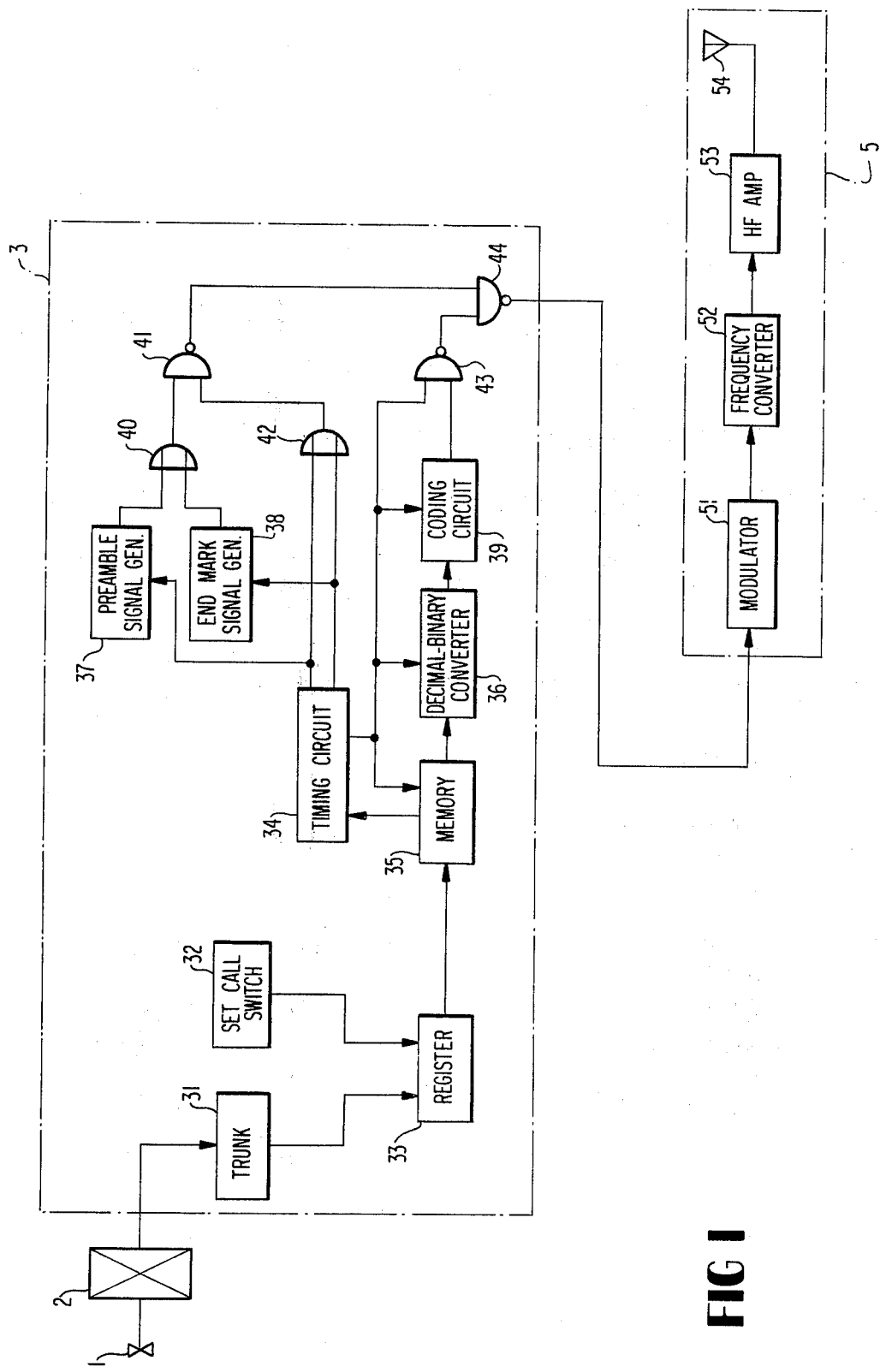
FIG. 1 is a block diagram of one preferred embodiment of a transmitter of the present invention.

Referring now to FIG. 1, a transmitter of the present invention is composed of an encoder 3 and a transmitting section 5. In, the encoder 3, a trunk 31 is connected to subscriber's telephone sets 1 through a conventional telephone exchange system 2. A register 33 counts dial pulses supplied from the trunk 31 to convert a called number into a binary-coded decimal number. A set call switch 32 is provided through which an operator can manually input a call number to the register 33. A memory 35 stores call numbers sent from the register 33. A conventional decimal-binary converter 36 converts a binary-coded decimal number (BCD) sent from the memory 35 into a binary number, and a coding circuit 39 adds check bits to the output of the converter 36. A preamble signal generator 37 repeatedly generates a unique word a predetermined number of times (for instance, 38 times), and an end mark signal generator 38 generates a signal representative of an end of a signal. A timing circuit 34 controls the respective circuits 35 to 39, and OR gtes 40 and 42, NAND gates 41, 43 and 44 logically combine the outputs of circuits 34, 37, 38 and 39 to provide the encoder output. In addition, the transmitting section 5 is composed of a conventional modulator (for instance, an FSK modulator) 51, a frequency-converter 52, a high frequency amplifier 53 and an antenna 54.

Figure 2A:
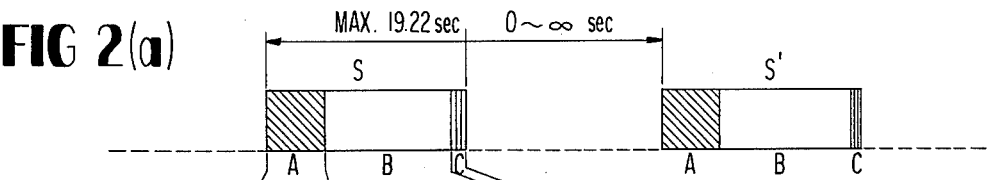
FIGS. 2(*a*) to 2(*e*) show one example of a composition of a transmission signal.
Figure 2B:
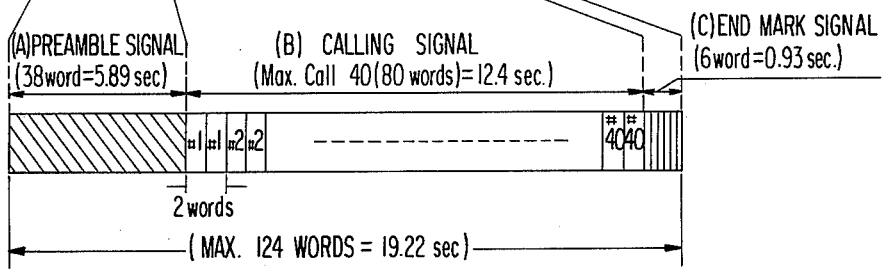
Figure 2C:
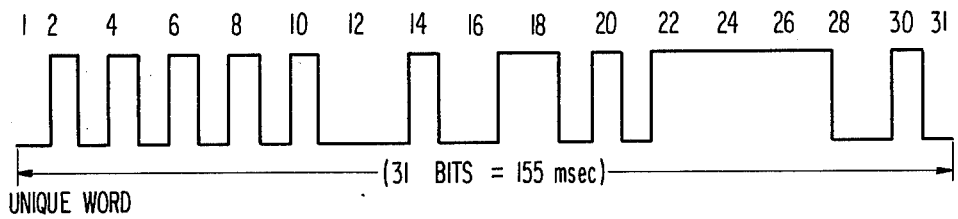
Figure 2D:
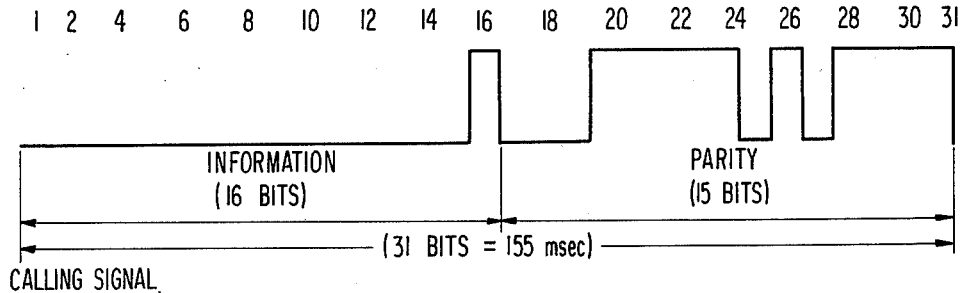
Figure 2E:
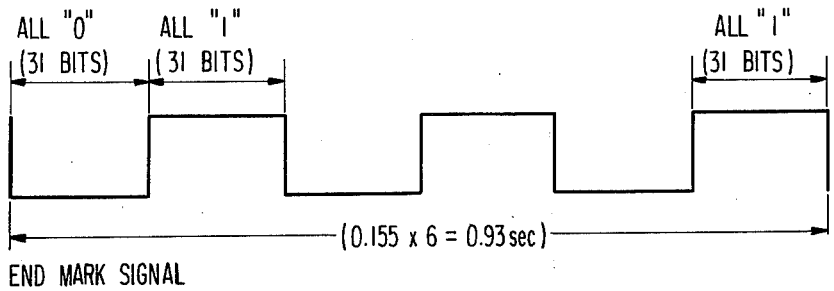

Now the operation of the transmitter will be described with reference to FIG. 2. Where an ordinary telephone subscriber calls a mobile receiver (shown in FIG. 3 as described later), the calling subscriber dials by his telephone set 1 a call number assigned to the mobile receiver. This dial signal is supplied to the trunk 31 through the exchange 2, and then sent to the register 33. When an operator manually inputs a call signal, it is fed to the register 33 by depressing the set call switch 32. When the register 33 has received a predetermined number of digits (for instance, 4 digits) of the call signal, it transfers its contents to the memory 35. The memory 35 successively stores the call numbers until it receives a read demand from the timing circuit 34. The output of the memory 35 starts the timing circuit 34 upon receipt of a first call number fed to the memory. A predetermined period after this start signal, the timing circuit 34 starts the preamble signal generator 37 to send a preamble signal to the transmitting section 5 through the OR gate 40 and the NAND gates 41 and 44 for the time duration of the preamble signal (for example, 5.89 seconds) as shown in FIG. 2(b). This preamble, signal consists of, for example, 38 unique words, and one unique word has a pattern of 31 bits as shown in FIG. 2(c). This preamble signal generator 37 is composed, for instance, of a 31-bit counter adapted to be activated by the output of the timing circuit 34, a ROM (Read-Only-Memory for example, $\mu$PD501D manufactured and marketed by NEC) adapted to be addressed by the output of the counter for providing the unique word and another counter for counting the number of transmissions of the unique word. When the transmission of the preamble signal has been terminated, the timing circuit 34 supplies a read command to the memory 35, and simultaneously starts the converter 36, coding circuit 39 and NAND gate 43 during the time duration of the calling signal in FIGS. 2(a) and 2(b). The data stored in the memory 35 are successively supplied to the decimal-binary converter 36 on a word-by-word basis until the memory becomes empty. The converter 36 converts the call signal in a BCD form into, for example, a 16-bit binary code. The coding circuit 39 adds 16 checking bits to each 16-bit information to form a word consisting of 31 bits as a whole, and successively supplies such binary words to the transmitting section 5 through the NAND gate 43 and 44. One example of the composition of one word in the calling signal is shown in FIG. 2(d), and in the calling signal, the same call number is transmitted twice and at the maximum 40 calls can be transmitted as shown in FIG. 2(b). This coding circuit 39 can be made of a circuit employing a shift register and an adder disclosed in Wesley Peterson, "Error-Correcting Codes" The M.I.T. Preses, pp. 149-152, 1961 Ref. 7. When the call numbers in the memory 35 has been cleared, the memory 35 provides an output signal to the timing circuit 34. The timing circuit 34 stops the circuits 35, 36 and 39 in response to this signal, and at the same time starts the end mark signal generator 38, for example, for 0.93 seconds as shown in FIGS. 2(b) and 2(c). The end mark signal is transmitted three times while repeating 31 bits of all "0" and 31 bits of all "1" as shown in FIG. 2(e). This end mark signal generator 38 can be composed of a 31-bit clock counter and a flip-flop adapted to be inverted in state by the output of the clock counter. When the transmission of the end mark signal has been terminated, the timing circuit 34 is stopped until the next call number is fed to the memory 35. Since the above-described signal group consisting of the preamble signal, calling signal and end mark signal is not transmitted if the calling signal is absent, the time intervl between the signal groups (S,S') is not contstant as shown in FIG. 2(a).

The output of the encoder 3 is modulated by the FSK modulator 51, frequency-converted by the frequency-converter 52, passed through the high frequency amplifier 53, and transmitted from the antenna 54 to the receivers.

It is to be noted that in the signal composition illustrated in FIGS. 2(a)~2(e), the number of repeated transmissions and the coding from of the preamble signal, unique word, calling signal and end mark signal may be selected arbitrarily.

Figure 3:
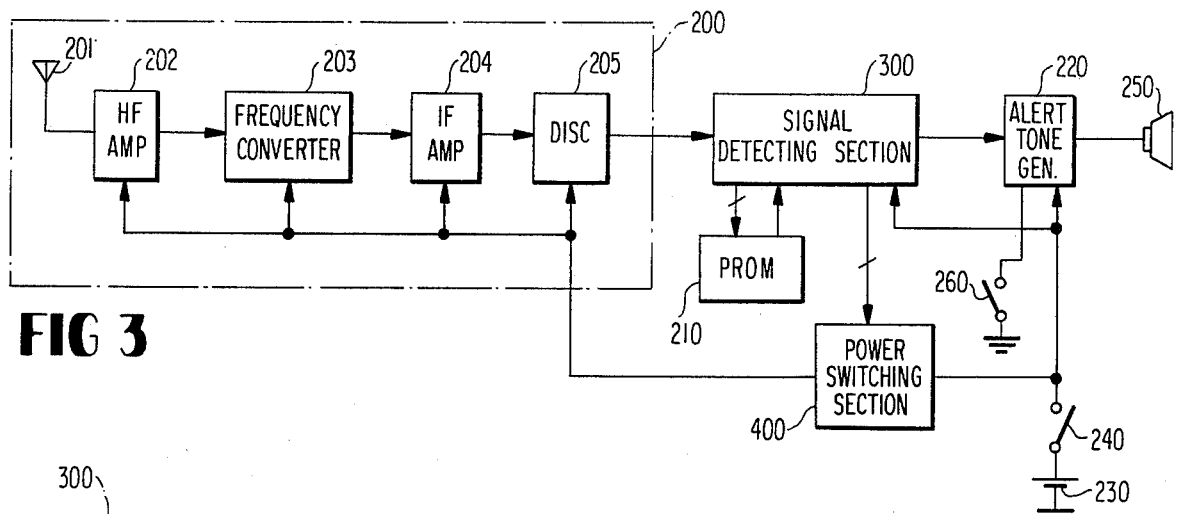
FIG. 3 is a block diagram of one preferred embodiment of a receiver of the present invention.

With reference to FIG. 3, an FSK-modulated carrier wave received by an antenna 201 is amplified by a high frequency amplifier 202, and fed to a frequency-converter 203 (which may be composed of a mixer and a local oscillator). The output of the frequency converter 203 is amplified by an IF-amplifier 204, and demodulated into a digital signal by a discriminator 205. These circuits are generally known, and they are, as a whole, called "receiving section 200". The demodulated digital signal is imputed to a signal detecting section 300. If the preamble signal is detected in the signal detecting section 300, then a power switching circuit 400 is activated so as to continuously supply the voltage of a battery 230 to the receiving section 200 through a switch 240, that is, the battery saving function is interrupted. Next, the calling signal is compared with the output siganl of a PROM (Programmable Read-Only-Memory) 210, and if these signals coincide with each other, then an alert tone generator 220 is activated to make a loud speaker 250 provide a calling tone. A switch 260 is provided for disabling the alert tone generator 220. When the signal detecting section 300 detects the end mark signal, the power switching circuit 400 is activated to supply a pulsed voltage to the receiving section 200.

Figure 4:
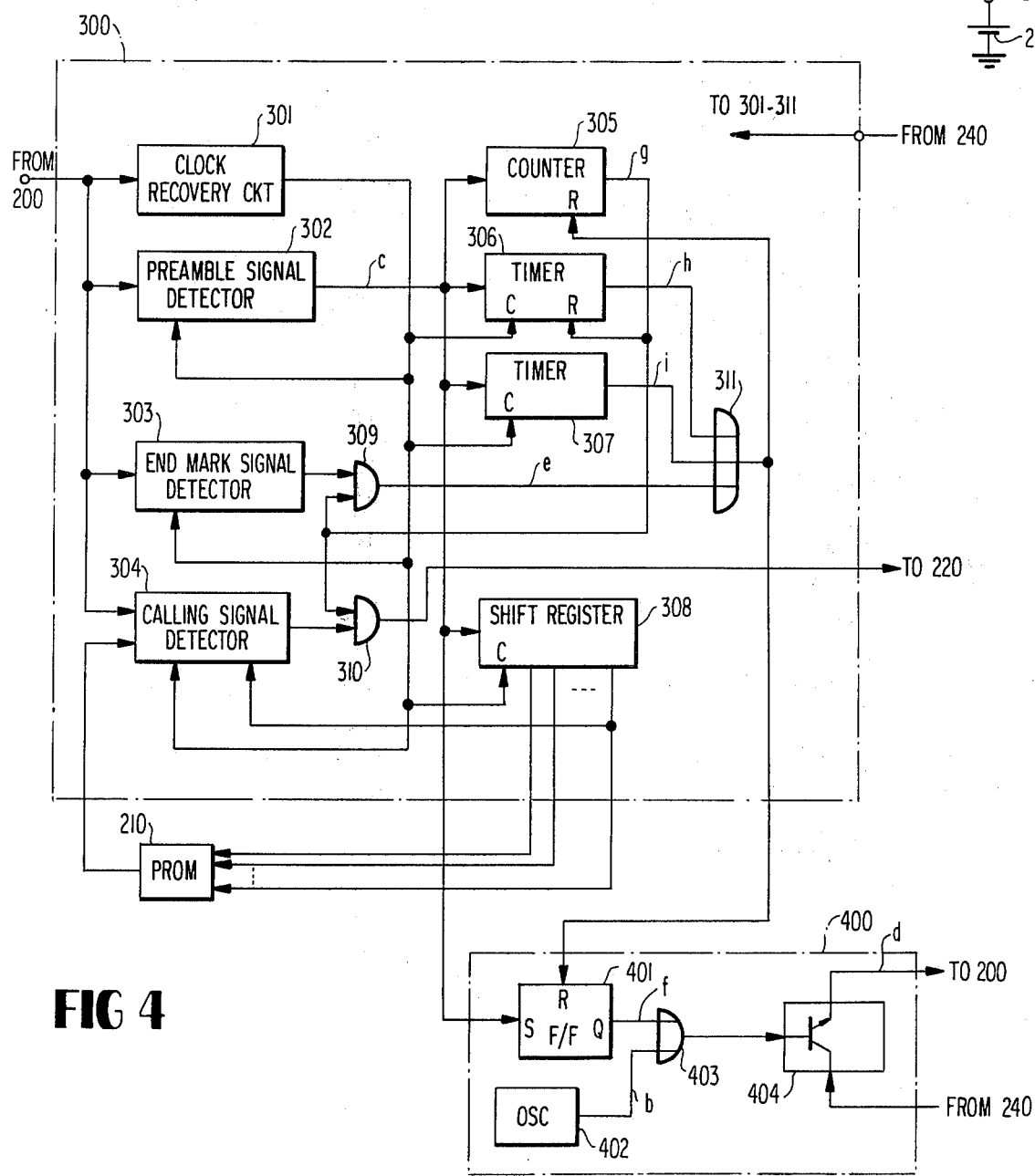
FIG. 4 is a more detailed block diagram of a signal detecting section and a power switching section shown in FIG. 3.

A more detailed construction of the signal detecting section 300 and the power switching section 400 is illustrated in FIG. 4. In this figure, the signal detecting section 300 is composed of a clock recovery circuit 301, a preamble signal detector 302, an end mark signal detector 303, a calling signal detector 304, a counter 305, timers 306 and 307, a shift register 308, AND gates 309 and 310, and an OR gate 311. The power switching section 400 is composed of a flip-flop 401, an oscillator 402, an OR gate 403, and a switch 404.

Figure 5:
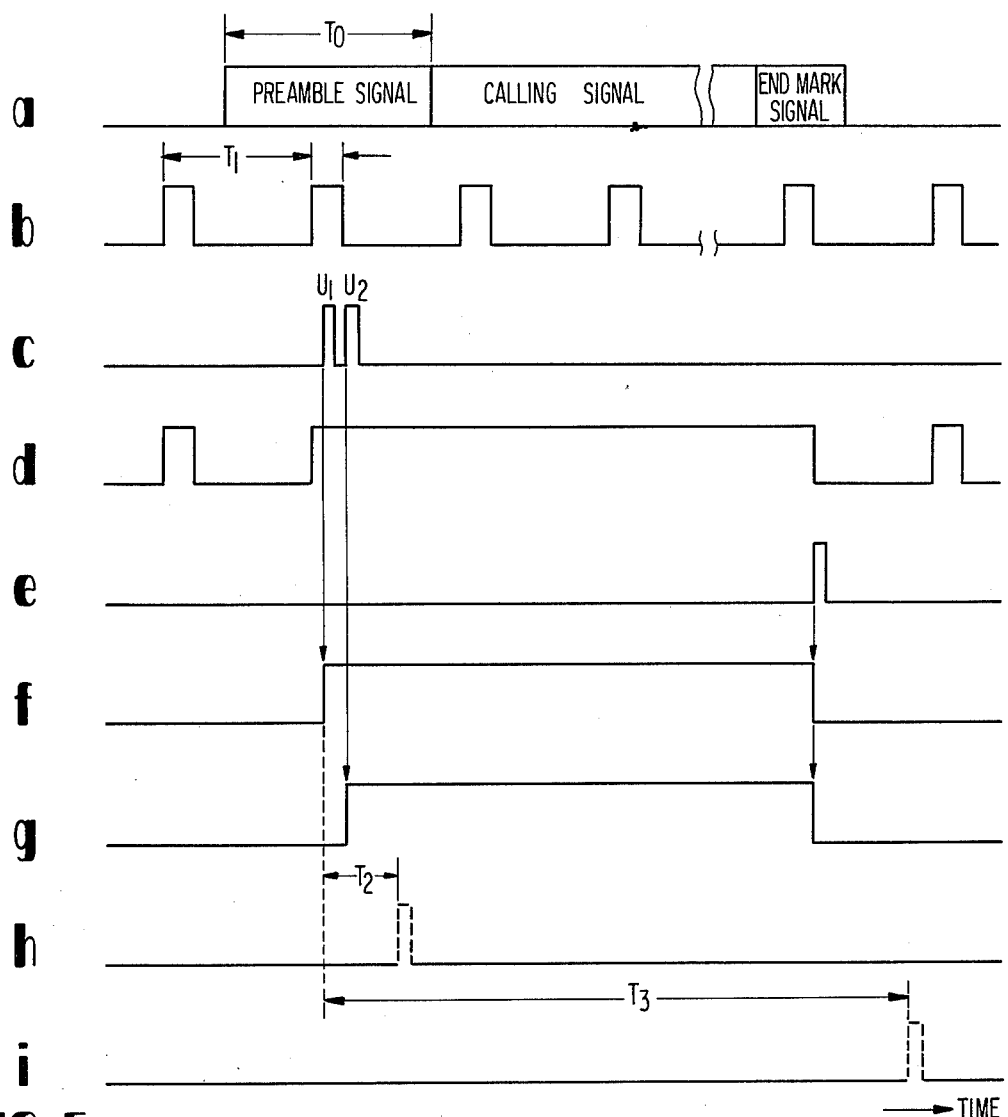
FIG. 5 is a time chart showing one example of waveforms at various points in FIG. 4.

The operation of the receiver of the present invention will now be described in greater detail with reference to the time chart shown in FIG. 5.

Normally, the receiving section 200 is operated intermittently. To this end, the switch 404 is driven by the output of the oscillator 402 (FIG. 5(b)) which has passed through the OR gate 403 to switch on and off the power supply to the receiving section 200. The period ($T_1$) of this intermittent operation is a little shorter than the duration ($T_0$) of the preamble signal sequence (FIG. 5(a)), and the time duration ($T_2$) in which power is supplied to the receiving section 200 is selected to be equal to the sum of a rising response time of the receiving section 200 and a time duration in which one or more of the unique words in the preamble signal can be received. Consequently, once the preamble signal is received, the receiving section 200 has its power supply turned ON at least once, so that one or more words of the unique words in the preamble signal can be received.

Figure 6:
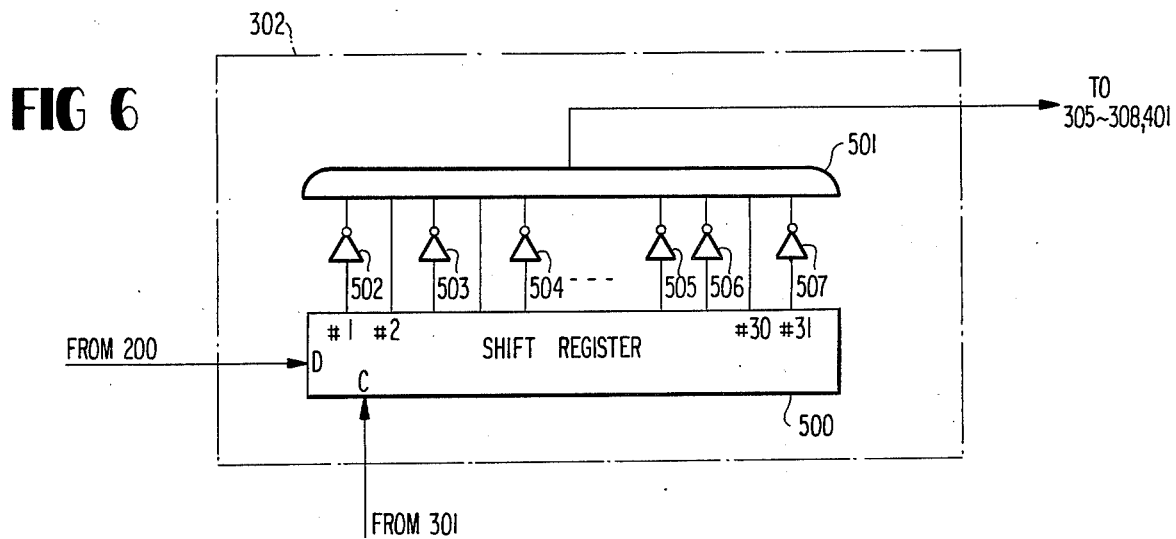
FIG. 6 shows one example of a detailed circuit construction of a preamble signal detector.

When power is being supplied to the receiving section 200 while the preamble signal is being transmitted, this signal is received and demodulated by the receiving section 200 as described above. The demodulated signal is fed to the signal detecting section 300. In the clock recovery circuit 301, a clock pulse is recovered from the signal fed thereto. For details of the clock recovery circuit, reference is made to U.S. Pat. No. 4,087,627—Ref. 8. The clock pulse recovered by this circuit is fed to a preamble signal detector 302, which selects a unique word such as the one illustrated in FIG. 2(c) among the input signal and generates a detection signal. One preferred embodiment of the preamble signal detector 302 is composed of a shift register 500, an AND gate 501 and inverters 502~507 as shown in FIG. 6. The outputs of the shift register 500 are fed to the AND gate 501 either inverted or not depending upon the signal pattern of the unique word (FIG. 2(c)). If the unique word illustrated in FIG. 2(c) is received, then the output of the AND gate 501 is turned to "1" indicating that a unique word has been detected. If a first unique word $U_1$ as shown in FIG. 5(c) is detected by the preamble signal detector 302 in the above-described manner, then the output of the detector 302 is fed to the counter 305 to activate the counter 305, and simultaneously it resets the timers 306 and 307 and the counter 308 (for instance, a shift register) and further sets the flip-flop 401. When the flip-flop 401 has been set, it controls the OR gate 403 to turn the switching element 404 ON regardless of the output state of the oscillator 402, and thereby to make the supply of power to the receiving section 200 continuous as shown in FIG. 5(d). Subsequently, a receiving operation for another unique word in the same preamble signal is repeated again. If reception of a second unique word should not arise within a pre-determined period of time after the reception of the first unique word, then there would be a possibility that the first received unique word may be another signal received erroneously. To avoid such a faulty operation, the timer 306 is employed so that if a second unique word is not received within a predetermined period (for instance, about 0.6 seconds represented by $T_2$ in FIG. 5 (h)) after the reception of the first unique word, then the flip-flop 401 is reset by the output of the timer 306 through the OR gate 311 to be restored to its initial state, and thereby to make the supply of power to the receiving section 200 intermittent in response to the output of the oscillator 402, while waiting for reception of a unique word in the preamble signal.

If a second unique word ($U_2$ in FIG. 5(c)) is received before the output of the timer 306 appears, the output of the counter (for example, a binary counter) 305 resets the timer 306 to stop its operation, and at the same time it starts the operation of the calling signal detector 304 and the end mark signal detector 303. In addition, the shift register 308 is reset by the output of the preamble signal detector 302, and it counts the clock fed from the clock recovery circuit 301 (or the number of bits) to detect the boundaries between the respective words. In the illustrated embodiment, one word is composed of 31 bits as shown in FIG. 2. The shift register 308 delivers an output pulse from its final stage once for every 31 clock pulses, and also supplies address signals for the PROM 210 from its 31 outputs at the respective stages. When the second unique word has been received, the calling signal detector 304 and the end mark signal detector 303 start to operate, and also an address signal for the PROM 210 is outputed from the shift register 308 in synchronism with the word in the calling signal of the input signal.

Figure 7:
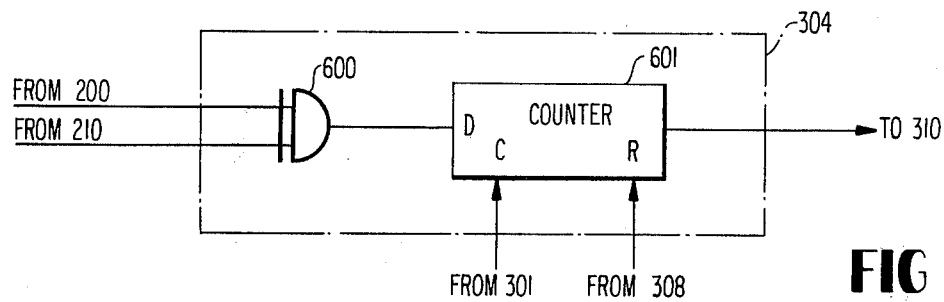
FIG. 7 shows one example of a detailed circuit construction of a calling signal detector.

The calling signal detector 304 compares the signal fed from the PROM 210 with the input signal, and when they coincide with each other, it activates the alert tone generator 220 as it acknowledges that its own calling signal has been transmitted, so that an alert tone is delivered from the speaker 250. One preferred embodiment of the calling signal detector 304 is composed of an Exclusive-OR gate 600 having an exclusive-OR function of the signal from the PROM 210 and the input signal, and a counter 601 as shown in FIG. 7. In response to the signal from the shift register 308, the state of the counter 601 is detected at every word period. That is, whether or not the output of the Exclusive-OR gate 600 has ever been "1" is checked, and if the output has not been "1" even once within one word period, then it is acknowledged that the signal from the PROM 210 and the input signal are coincident with each other, and so, the output of the counter 601 activates the alert tone generator 220 via the AND gate 310. On the other hand, if the output of the Exclusive-OR gate 600 is "1" one or more times during one word period, then the detector 304 determines that the input calling signal is different from its own calling signal, because the respective bits of these signals do not coincide with each other at the bits for which the output of the Exclusive-OR gate is "1".

Subsequently, when the calling signal disappears, an end mark signal is transmitted. When the end mark signal detector 303 detects an end mark signal as shown in FIG. 5 (e), its output signal resets the counter 305 and the flip-flop 401 via the AND gate 309 and the OR gate 311 to turn the output of the flip-flop 401 to "0", so that the initial intermittent switching state where the output of the switching element 404 is switched ON and OFF in response to the output of the oscillator 402, can be recovered.

One preferred embodiment of the end mark signal detector 303 can be composed, similarly to the preamble signal detector 302 in FIG. 6, of a 186-bit shift register, 186 inverters and an AND gate. Alternatively, another method can be employed, in which the end mark signal generator 38 used in the transmitter is provided in the receiver and an Exclusive-OR of the output of the generator 38 and the input signal is taken similarly to the calling signal detector 304. If the end mark signal should not be received due to fading or the like, the power supply to the receiving section 200 would be effected continuously, and thus the current drain of the battery could not be reduced. To obviate such disadvantage, provision is made such that even if the end mark signal should not be received, a predetermined time duration ($J_3$ in FIG. 5 (i), that is equal to, for example, about 20 seconds) after the detection of the unique word, an output signal is delivered from the timer 307 to reset the counter 305 and the flip-flop 401 through the OR gate 311, thereby to restore the receiver to its initial state. To provide these timers 306 and 307, a timer having a given time limit can be produced by frequency-dividing the output of the clock recovery circuit 301 by a counter (for instance, CD4017A or CD4024A manufactured and marketed by RCA). Otherwise, these timers can be constructed by utilizing a time constant of a capacitor and a resistor. To provide the oscillator 402, an astable multivibrator or a CR oscillator employing transistors may be used. For the switching element 404, a transistor, FET, SCR, etc. are available. The PROM 210 can be realized by using a diode matrix or a transistor matrix (for example, μPB406 manufactured and marketed by NEC).

Figure 8:
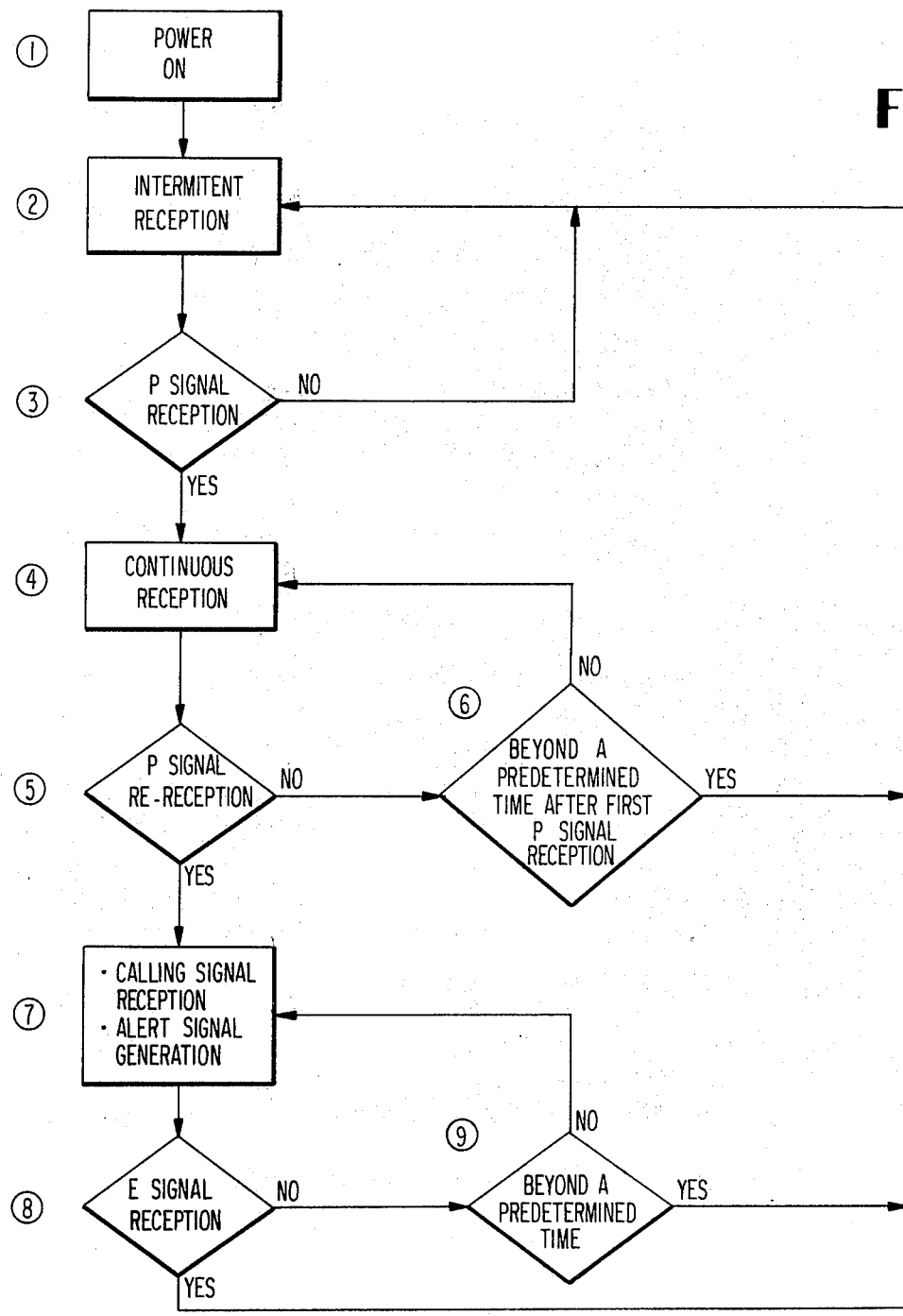
FIG. 8 is a flow chart showing the operation of the receiver unit.

The above-described operation is summarized as follows referring to FIG. 8:

(1) The power source is switched ON.

(2) The power source for the receiving section is intermittently switched ON to effect intermittent reception.

(3) When the power source for the receiving section is ON, the unique word in the preamble signal (P signal) is sought for, and if it is received, the operation advances to the step (4). If it is not received, the operation goes back to the step (2)

(4) Since the first unique word has been received, the power supply to the receiving section is made continuous.

(5) The second unique word is sought for, and if it is received, the operation advances to the step (7). If it is not received, the operation goes to the step (6).

(6) If a predetermined length of time has elapsed after the reception of the first unique word, the operation goes back to the step (2), but otherwise the operation goes back to the step (4).

(7) If the received calling signal is the receiver's own calling signal, an alert tone is generated.

(8) If the end mark signal (E signal) is received, the operation goes back to the step (2) because the calling signal sequence has been terminated.

(9) Even though the end mark signal (E signal) is not received, then the operation goes back to the step (2) when a predetermined length of time has elapsed after the reception of the first unique word.

Thus, using the preamble signal and the end mark signal, the average power consumption can be reduced and the life of the battery used can be substantially increased. While the codes of the preamble signal and the end mark signal are of only one kind in the illustrated embodiment, respectively, if the detectors for these signals are constructed similarly to the combination of the calling signal detector and the PROM, two or more kinds of codes of these signals can be readily detected by setting patterns of the PROM. In addition, to activate the calling signal detector 304 and the end mark signal detector 303 upon reception of one unique word, it is only necessary to omit the counter 305 and to control the AND gates 309 and 310 directly by the output of the preamble signal detector 302.

Owing to such possible modifications, the power consumption reduction effect can be further enhanced by employing a plurality of preamble signals and a plurality of end mark signals on the same carrier wave, dividing the receivers used into a number of groups, and selectively bringing only a necessary group of receivers into a continuous reception state.

In addition, by accommodating the calling signal detector and the memory capacity of the PROM or the PROM itself in multiple in each receiver, it is possible to make one receiver respond to a plurality of calling signals. In this case, the identification of the kinds of the received calling signals can be made by the difference in the intensity of tone or in the period of intermittent sounding, or by optical indication.

What is claimed is:

1. A digital radio paging communication receiver for receiving a carrier wave modulated with a preamble digital signal, a calling digital signal and an end mark digital signal, comprising: first means for receiving said modulated carrier wave and demodulating it into said preamble digital signal, calling digital signal and end mark digital signal; second means for recovering a clock pulse from the output of said first means; third, fourth and fifth means connected to the output of said first means for detector said preamble digital signal, said calling digital signal and said end mark digital signal in synchronism with said clock pulse, respectively; sixth means for supplying a power source voltage to said first means; seventh means for generating first pulses having a predetermined period; and eighth means provided between said first means and said sixth means for controlling the supply of said power source voltage in response to the output of said seventh means or in response to the outputs of said third means and said fifth means.

2. A receiver as claimed in claim 1, further comprising ninth means responsive to the output of said fourth means for generating an alert signal.

3. A receiver as claimed in claim 1, further comprising tenth and eleventh means responsive to the output of said third means for generating second and third pulses, respectively, after the lapse of first and second predetermined periods, respectively, to control said eighth means.

4. A receiver as claimed in claim 1, in which said fourth means consists of twelfth means responsive to the outputs of said second and third means for generating a read signal, thirteenth means responsive to said read signal for successively generating calling digital signals assigned to said receiver, fourteenth means having an Exclusive-OR function of the outputs of said first and thirteenth means, and fifteenth means for counting the output of said fourteenth means.

5. A receiver as claimed in claim 3, in which said eighth means consists of sixteenth means adapted to be set by the output of said third means and reset by the outputs of said fifth, tenth and eleventh means, and seventeenth means for controlling the supply of said power source voltage in response to the outputs of said seventh and sixteenth means.

6. A receiver as claimed in claim 1, characterized further in that said preamble digital signal is composed of a plurality of unique words, the pulse width of said first pulse being at least longer than one word length of said unique words, and the period thereof being shorter than the length of said preamble digital signal.

7. A digital radio paging communication system including a transmitter and a plurality of receivers, said transmitter comprising first, second and third means for generating a preamble digital signal, a calling digital signal and an end mark digital signal, respectively, fourth means for selectively controlling the outputs of said first, second and third means to arrange them into a predetermined signal sequence, and fifth means for modulating a carrier wave with the output of said fourth means and successively transmitting the modulated carrier wave; said each of said receivers comprising sixth means for receiving said modulated carrier wave and demodulating it into said preamble digital signal, calling digital signal and end mark digital signal, seventh means for receiving a clock pulse from the output of said sixth means, eighth, ninth and tenth means connected to the output of said sixth means for detecting said preamble digital signal, said calling digital signal and said end mark digital signal in synchronism with said clock pulse, respectively, eleventh means for supplying a power source voltage to said sixth means, twelfth means for generating pulses having a predetermined period, and thirteenth means for controlling the supply of said power source voltage in response to the output of said twelfth means or in response to the outputs of said eighth means and said tenth means.

8. A communication system as claimed in claim 7, in which said receiver further comprises fourteenth means for generating an alert signal in response to the output of said ninth means, and fifteenth means for converting the output of said fourteenth means into an audio signal.

9. A receiver as claimed in claim 7, further comprising fifteenth and sixteenth means responsive to the output of said eighth means for generating second and third pulses, respectively, after the lapse of first and second predetermined periods, respectively, to control said thirteenth means.

10. A receiver as claimed in claim 7, in which said ninth means consists of seventeenth means responsive to the outputs of said seventh and eighth means for generating a read signal, eighteenth means responsive to said read signal for successively generating calling digital signals assigned to said receiver, nineteenth means having an Exclusive-OR function of the outputs of said sixth and eighteenth means, and twentieth means for counting the output of said nineteenth means.

11. A receiver as claimed in claim 9, in which said thirteenth means consists of twenty-second means adapted to be set by the output of said eighth means and reset by the outputs of said tenth, fifteenth and sixteenth means, and twenty-second means for controlling the supply of said power source voltage in response to the outputs of said twelfth and twenty-first means.

12. A receiver as claimed in claim 7, characterized further in that said preamble digital signal is composed of a plurality of unique words, the pulse width of said first pulse being at least longer than one word length of said unique words, and the period thereof being shorter than the length of said preamble digital signal.

* * * * *

UNITED STATES PATENT AND TRADEMARK OFFICE
CERTIFICATE OF CORRECTION

PATENT NO. : 4,194,153

DATED : March 18, 1980

INVENTOR(S) : Masaru Masaki and Akio Yotsutani

It is certified that error appears in the above—identified patent and that said Letters Patent is hereby corrected as shown below:

IN THE SPECIFICATION:

Column 2, line 53- delete "gtes" insert --gates--

Column 3, line 64- delete "intervl" insert --interval--

Column 4, line 17- delete "imputed" insert --inputed--

IN THE CLAIMS:

Column 7, line 68- delete "detector" insert --detecting--

Signed and Sealed this

Eighth Day of July 1980

[SEAL]

Attest:

SIDNEY A. DIAMOND

Attesting Officer

Commissioner of Patents and Trademarks